US012739910B2

(12) United States Patent
Ambede et al.

(10) Patent No.: US 12,739,910 B2
(45) Date of Patent: Sep. 15, 2026

(54) MEASUREMENT-BASED CONTROL OF MULTI-LINK OPERATION

(71) Applicant: Telefonaktiebolaget LM Ericsson (publ), Stockholm (SE)

(72) Inventors: Abhishek Ambede, Huddinge (SE); Jonas Sedin, Brentford (GB); Leif Wilhelmsson, Lund (SE); Miguel Lopez, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 18/278,351

(22) PCT Filed: Feb. 26, 2021

(86) PCT No.: PCT/EP2021/054842
§ 371 (c)(1),
(2) Date: Aug. 22, 2023

(87) PCT Pub. No.: WO2022/179696
PCT Pub. Date: Sep. 1, 2022

(65) Prior Publication Data

US 2024/0324040 A1 Sep. 26, 2024

(51) Int. Cl.
*H04B 17/309* (2015.01)
*H04B 17/345* (2015.01)
(Continued)

(52) U.S. Cl.
CPC .......... *H04W 76/15* (2018.02); *H04B 17/345* (2015.01); *H04B 17/346* (2023.05);
(Continued)

(58) Field of Classification Search
CPC ... H04B 7/02–12; H04B 17/0082–3913; H04J 11/0023–0066;
(Continued)

(56) References Cited

U.S. PATENT DOCUMENTS

2019/0207657 A1 7/2019 Cao
2021/0321473 A1 * 10/2021 Monajemi ............ H04W 24/10
(Continued)

FOREIGN PATENT DOCUMENTS

WO 2018017977 A1 1/2018

OTHER PUBLICATIONS

Au, Edward , "Compendium of straw polls and potential changes to the Specification Framework Document", IEEE P802.11 Wireless LANs, 20/0566r87, Nov. 3, 2020, 1-250.
(Continued)

*Primary Examiner* — Timothy J Weidner
(74) *Attorney, Agent, or Firm* — Murphy, Bilak & Homiller, PLLC

(57) ABSTRACT

On a first channel, an access point (10) of the wireless communication system maintains a first wireless link to a first wireless station (11). On a second channel, the access point (10) maintains a second wireless link to a second wireless station (11). Further, the access point receives a measurement report from the first wireless station (11). The measurement report represents a level of interference from the second channel to the first channel. Based on the measurement report, the access point (10) controls multi-link operation on the first wireless link and the second wireless link.

20 Claims, 8 Drawing Sheets

(51) Int. Cl.

| | |
|---|---|
| ***H04B 17/354*** | (2015.01) |
| ***H04W 24/08*** | (2009.01) |
| ***H04W 24/10*** | (2009.01) |
| ***H04W 48/06*** | (2009.01) |
| ***H04W 48/16*** | (2009.01) |
| ***H04W 72/0453*** | (2023.01) |
| ***H04W 72/541*** | (2023.01) |
| ***H04W 76/15*** | (2018.01) |
| ***H04W 76/25*** | (2018.01) |
| ***H04W 84/12*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.

CPC ......... *H04B 17/347* (2023.05); *H04B 17/354* (2015.01); *H04W 24/08* (2013.01); *H04W 24/10* (2013.01); *H04W 48/06* (2013.01); *H04W 48/16* (2013.01); *H04W 72/0453* (2013.01); *H04W 72/541* (2023.01); *H04W 76/25* (2018.02); *H04W 84/12* (2013.01); *H04W 88/02* (2013.01); *H04W 88/08* (2013.01); *H04W 92/02* (2013.01); *H04W 92/10* (2013.01)

(58) Field of Classification Search

CPC ....... H04J 2011/0003–0096; H04W 8/22–245; H04W 24/02–10; H04W 48/02–20; H04W 72/02–569; H04W 76/10–50; H04W 84/02–16; H04W 88/02–12; H04W 92/02–04; H04W 92/10; Y02D 30/70

See application file for complete search history.

(56) References Cited

U.S. PATENT DOCUMENTS

| | | | | |
|---|---|---|---|---|
| 2023/0103325 | A1* | 4/2023 | Li ......................... | H04W 24/08 |
| 2024/0275507 | A1* | 8/2024 | Tanaka .................. | H04W 24/06 |

OTHER PUBLICATIONS

IEEE , "Part 11: Wireless LAN Medium Access Control (MAC) and Physical Layer (PHY) Specifications", IEEE P802.11ax™ /D7.0, Draft Standard for Information technology—Telecommunications and information exchange between systems Local and metropolitan area networks—Specific requirements, Sep. 2020, 1-822.

IEEE , "Draft Standard for Information technology—Telecommunications and information exchange between systems Local and metropolitan area networks—Specific requirements", IEEE P802.11be™ /D0.1, Part 11: Wireless LAN Medium Access Control (MAC) and Physical Layer (PHY) Specifications Amendment 8: Enhancements for extremely high throughput (EHT), Sep. 2020, 1-299.

IEEE , "Part 11: Wireless LAN Medium Access Control (MAC) and Physical Layer (PHY) Specifications", IEEE Std 802.11™—2016 (Revision of IEEE Std 802.11-2012), Dec. 7, 2016, 1-3534.

* cited by examiner

MEASUREMENT-BASED CONTROL OF MULTI-LINK OPERATION

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM band, the 5 GHz band, the 6 GHz band, and the 60 GHz band using more advanced channel access technologies. Historically, WLAN (Wireless Local Area Network) technology based on the IEEE 802.11 standards family, also denoted as Wi-Fi, has been the dominant standard in unlicensed bands, specifically for applications requiring support for high data rates. The WLAN technology is specified in "IEEE Standard for Information technology—Telecommunications and information exchange between systems Local and metropolitan area networks-Specific requirements—Part 11: Wireless LAN Medium Access Control (MAC) and Physical Layer (PHY) Specifications," IEEE Std 802.11-2016 (Revision of IEEE Std 802.11-2012), in the following also denoted as IEEE WLAN standard.

An enhancement of the WLAN technology referred to as EHT (Extremely High Throughput), to be introduced with an amendment denoted as IEEE 802.11be, is planned to introduce a feature denoted as ML (multi-link). Corresponding functionalities are for example described in IEEE draft "IEEE P802.11be/D0.1", September 2020, in the following denoted as EHT draft amendment. In ML, a device termed as multi-link device (MLD) has multiple affiliated stations (STAs), each of which can communicate using independent wireless channels, also referred to as links. Communication over multiple links by an MLD is termed as multi-link operation (MLO). For example, an MLD can have two affiliated STAs, one communicating using a channel in the 5 GHz frequency band and the other communicating using a channel in the 6 GHz frequency band. Alternatively, as another example, an MLD can have two affiliated STAs, communicating using different channels in the 6 GHz frequency band.

An MLD can use its affiliated STAs and corresponding supported channels to perform simultaneous transmit (TX) MLO, simultaneous receive (RX) MLO, or simultaneous TX and RX (STR) MLO. This can help to improve the throughput and latency performance, as well as spectrum utilization. An MLD trying to perform STR MLO may face severe cross-channel self-interference (SI) problems due to leakage from its TX to RX channels. The cross-channel SI signal power in a RX channel can be orders of magnitude higher than the power of the desired signal, thereby affecting the reception and/or sensing ability of the RX chain.

If an MLD can handle the cross-channel SI problem and thus perform STR over a pair of channels, that pair of channels can be classified as STR. On the other hand, if transmitting over one channel results in inability to simultaneously receive over another channel, that pair of channels can be classified as non-STR (NSTR). In the EHT amendment, it is planned that an MLD shall announce its STR capability related to a pair of supported channels. Simultaneous TX and simultaneous RX MLOs over NSTR pair of channels typically require that the transmissions over the two channels are synchronized to some extent, e.g., in terms of time-alignment to prevent occurrence of STR situations cross-channel SI resulting therefrom. This may result in rather strict requirements while executing such MLOs. On the other hand, when using an STR pair of channels, there may be significantly less requirements.

In the context of MLO, an MLD with two or more affiliated access point (AP) STAs, i.e., an MLD having AP functionalities on its channels, may be denoted as an AP MLD. An MLD with two or more affiliated non-AP STAs can in turn be referred to as a non-AP MLD. An AP MLD can perform simultaneous downlink (DL) MLO or simultaneous uplink (UL) MLO in cooperation with non-AP STAs. Additionally, an AP MLD that can perform STR MLO over two channels can also perform simultaneous DL and UL MLO, with the possibility of independently transmitting and receiving various types of frames over its channels.

As mentioned above, in the case of a STR capable channel pair, channel access can be performed in an entirely independently manner. Section 35.3.12 of the EHT draft amendment defines channel access techniques related to NSTR channel pairs. In the case of an NSTR channel pair at a non-AP MLD, a STA that is affiliated with that MLD might not transmit while reception at another STA affiliated with the same MLD is ongoing and vice-versa. Further, an AP MLD should not transmit to an associated STA while the non-AP MLD with which the STA is affiliated is also transmitting on another corresponding NSTR channel. It is typically up to the AP MLD to ensure that its associated STAs affiliated with a non-AP MLD do not transmit and receive simultaneously on NSTR channels.

By way of example, the EHT draft amendment defines a set of transmission rules, referred to as PPDU (physical layer protocol data unit) end-time alignment. In this case, the MLD makes sure that the transmitted PPDUs across a NSTR channel pair at a non-AP MLD end at approximately the same time, so as to make sure that all of the BAs (block acknowledgements) in response to the PPDUs are transmitted at the same time. As a result, the NSTR non-AP MLD is not forced to transmit and receive at the same time. This may help to avoid STR at the NSTR non-AP MLD when it is involved in a simultaneous DL or UL MLO.

The EHT draft amendment does however not further address MLO involving a single AP MLD and non-AP STAs affiliated with different non-AP devices. Further, the EHT amendment does not address MLO involving an EHT-based AP MLD and non-AP STAs affiliated with different non-AP devices, either non-MLDs or MLDs, that support different standards from the IEEE 802.11 standards family. In such scenarios, it may be difficult to control the MLO of the AP MLD, e.g., with respect to appropriate selection between the above-mentioned different types of MLO.

Accordingly, there is a need for techniques which allow for controlling MLO in various scenarios.

SUMMARY

According to an embodiment, a method of controlling wireless transmissions in a wireless communication system is provided. According to the method, on a first channel, an access point of the wireless communication system maintains a first wireless link to a first wireless station. On a second channel, the access point maintains a second wireless link to a second wireless station. Further, the access point receives a measurement report from the first wireless station. The measurement report represents a level of interference from the second channel to the first channel. Based on the measurement report, the access point controls multi-link operation on the first wireless link and the second wireless link.

According to a further embodiment, an access point for a wireless communication system is provided. The access point is configured to, on a first channel, maintain a first wireless link to a first wireless station and, on a second channel, maintain a second wireless link to a second wireless station. Further, the access point is configured to receive a measurement report from the first wireless station. The measurement report represents a level of interference from the second channel to the first channel. Further, the access point is configured to, based on the measurement report, control multi-link operation on the first wireless link and the second wireless link.

According to a further embodiment, an access point for a wireless communication system is provided. The access point comprises at least one processor and a memory. The memory contains instructions executable by said at least one processor, whereby the access point is operative to, on a first channel, maintain a first wireless link to a first wireless station and, on a second channel, maintain a second wireless link to a second wireless station. Further, the memory contains instructions executable by said at least one processor, whereby the access point is operative to receive a measurement report from the first wireless station. The measurement report represents a level of interference from the second channel to the first channel. Further, the memory contains instructions executable by said at least one processor, whereby the access point is operative to, based on the measurement report, control multi-link operation on the first wireless link and the second wireless link.

According to a further embodiment of the invention, a computer program or computer program product is provided, e.g., in the form of a non-transitory storage medium, which comprises program code to be executed by at least one processor of an access point for a wireless communication system. Execution of the program code causes the access point to, on a first channel, maintain a first wireless link to a first wireless station and, on a second channel, maintain a second wireless link to a second wireless station. Further, execution of the program code causes the access point to receive a measurement report from the first wireless station. The measurement report represents a level of interference from the second channel to the first channel. Further, execution of the program code causes the access point to, based on the measurement report, control multi-link operation on the first wireless link and the second wireless link.

Details of such embodiments and further embodiments will be apparent from the following detailed description of embodiments.

DETAILED DESCRIPTION

Figure 1:
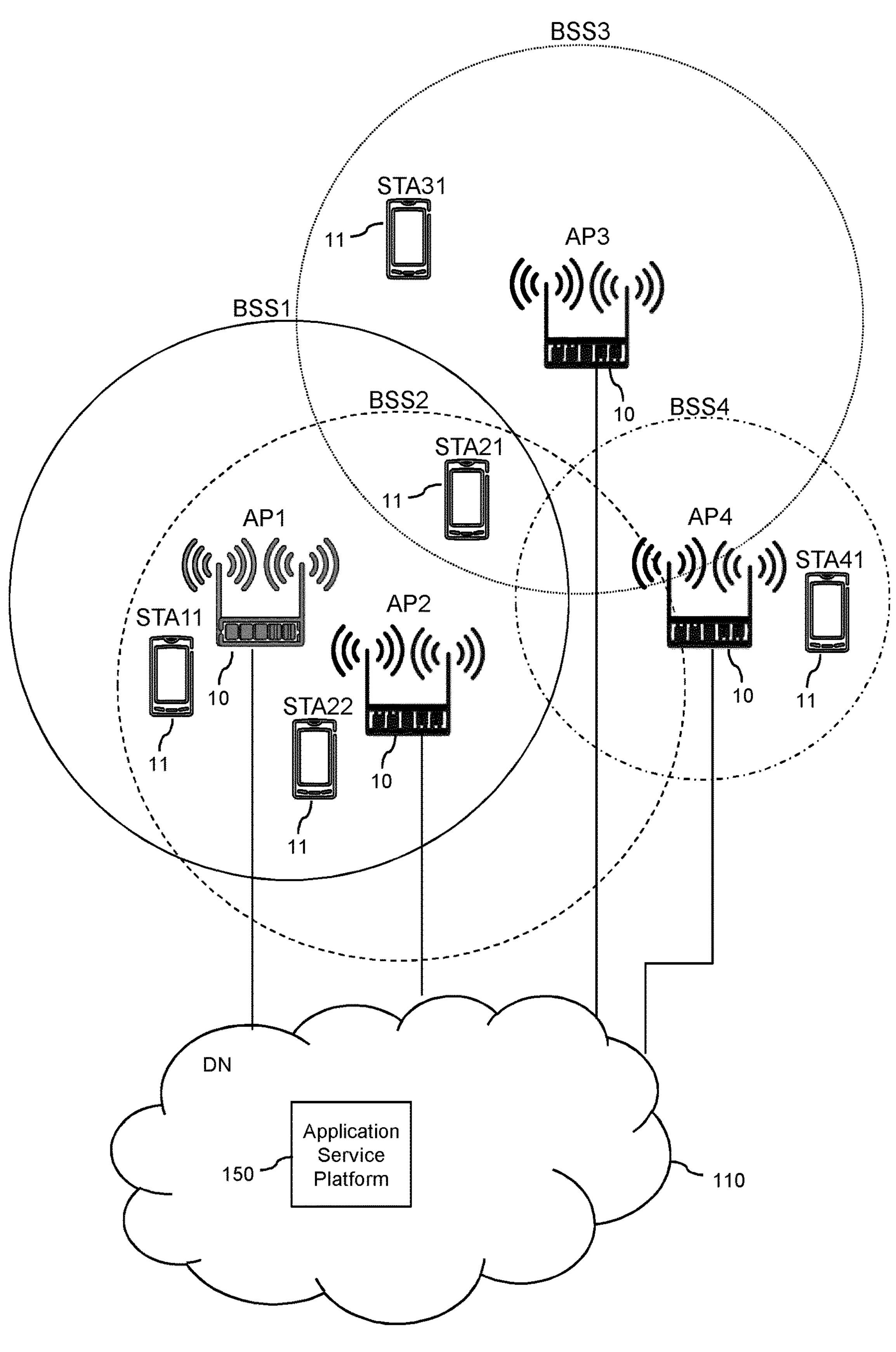
FIG. 1 schematically illustrates a wireless communication system according to an embodiment.

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP (3$^{rd}$ Generation Partnership Project).

In the illustrated concepts an AP (access point) utilizes multiple different channels to maintain multiple links to associated STAs (stations). The AP thus utilizes MLO with respect to its associated STAs. In the following the AP will thus also be referred to as AP MLD. The associated STAs may be MLDs or non-MLDs. For purposes of explanation, the following description assumes that the associated STAs include a first STA, to which the corresponding link is maintained on a first channel, and a second STA, to which the corresponding link is maintained on a second channel. It is however noted that the illustrated concepts could also be applied to higher numbers of STAs operating on different channels.

In the illustrated concepts, the AP receives a measurement report from at least one of its associated STAs. The measurement report indicates a level of interference from another channel. For example, the AP can receive a measurement report from the first STA, indicating a level of interference from the second channel, used for maintaining the link between the AP and the second STA. Alternatively or in addition, the AP can receive a measurement report from the second STA, indicating a level of interference from the first channel, used for maintaining the link between the AP and the first STA. Such measurement report(s) may provide the AP with valuable information for assessing cross-channel interference between the channels. Based on such measurement report(s), the AP can thus efficiently control its MLO. When controlling the MLO, the AP MLD may for example consider path loss estimates between the AP MLD and STAs and/or path loss estimate between the STAs. Such path loss estimates may be derived from the measurement report(s). Further, the control of the MLO may be based on additional factors like a geometry of deployment and/or supported transmit processing capabilities of the respective STA, such as transmit beamforming, power control, available choice of MCS (modulation and coding scheme). This control of the MLO may for example involve selecting between different types of MLO on the respective channels. For example, the AP could select between STR MLO and NSTR MLO on the first channel and the second channel. Further, the AP could decide whether to use simultaneous UL MLO on the first channel and the second channel, whether to use simultaneous DL MLO on the first channel and the second channel, and/or whether to use simultaneous UL and DL MLO on the first channel and the second channel.

In addition or as an alternative, the control of the MLO can involve allocating appropriate channels to the associated STAs, with the aim of reducing the risk of interference, in particular interference on DL transmissions to any associated STA. Further, the control of the MLO could be based on scheduling of transmissions. For example, in certain situations, the AP could mandate only scheduled UL channel access by the STAs. Further, the AP MLD could select appropriate TX processing of the DL transmissions and/or UL transmissions such that adverse effects of cross-channel interference are avoided or at least reduced. The TX processing may involve TX power control, TX beamforming or selection of MCS. In some cases, the AP MLD could also refrain from using any MLO if a potential cross-channel interference problem, identified based on the measurements, cannot be reduced or tackled using the above-mentioned measures.

The measurement report(s) may be based on measurements performed by one or more of the STAs, and these measurements can be orchestrated in various ways. For example, the respective STA could perform and report a measurement of the level of interference from the other channel in response to a request from the AP. Alternatively, the respective STA could perform and report a measurement of the level of interference from the other channel in in an autonomous manner. In some cases, the respective STA could also perform a measurement of the level of interference from the other channel in an autonomous manner and send the measurement report in response to a request from the AP. The respective STA may perform the measurement concurrently with a UL transmission on the other channel or concurrently with a DL transmission on the other channel. In some cases, the AP may instruct another STA to perform such UL transmission. In other cases, the AP itself may perform a dedicated DL transmission, during which the measurement is performed. In other cases, such UL transmission or DL transmission, during which the measurement is performed, could be any UL transmission or DL transmission in regular communication between the AP and its associated STAs, e.g., a UL transmission of user data and/or of control data or a DL transmission of user data and/or of control data.

The MLO may be based on ML functionalities of the EHT technology according to the IEEE 802.11be amendment. In these ML functionalities, an MLD is considered to have multiple affiliated STAs, each of which can communicate using independent wireless channels or links. For example, an MLD can have two affiliated STAs, one operating using one or more channels in the 5 GHz frequency band and the other operating using one or more channels in the 6 GHz frequency band. According to another example, an MLD can have two affiliated STAs, each operating using channels in the 6 GHz frequency band. As used herein, a device capable of performing MLO is considered to be an MLD. An AP capable of performing MLO is considered to be an AP MLD. A non-AP device capable of performing MLO is considered to be a non-AP MLD. An MLD can use its affiliated STAs and corresponding supported channels to perform simultaneous TX MLO, simultaneous RX MLO, or STR MLO. If a TX operation on one channel results in inability to perform RX operation on another channel, that pair of channels can be classified as NSTR, and these channels can be used in NSTR MLO.

FIG. 1 illustrates an exemplary wireless communication system in which the illustrated concepts may be implemented. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, and STA41. The station STA11 is served by AP1 (in a first BSS denoted as BSS1), the stations STA21 and STA22 are served by AP2 (in a second BSS denoted as BSS2). The station STA31 is served by AP3 (in a third BSS denoted as BSS3). The station STA41 is served by AP4 (in a fourth BSS denoted as BSS4). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 1, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band. Some of the stations 11 may support MLO, i.e., may be MLDs.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 1 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

In the system of FIG. 1, one or more of the APs 10 are assumed to be MLDs which can operate as outlined above to control MLO based on one or more measurement reports from their associated STAs. For example, in the system of FIG. 1, AP2 could use MLO with respect to STA21 and STA22 and control this MLO based on one or more measurement reports received from STA21 and/or from STA22, with STA21 and STA22 being non-MLDs or MLDs. Further, STA21 and STA22 could operate on the basis of different standards from the IEEE 802.11 family. For example, one could support the EHT amendment, while the other supports only earlier amendments of the IEEE 802.11 standard.

To enable efficient usage of ML capabilities the AP MLD, the AP MLD may select between different types of MLO, depending on the measurement reports received from its associated STAs, thereby efficiently taking into account the cross-channel interference situation and also the individual capabilities of its associated STAs. Further, depending on the received measurement reports the AP MLD may decide how to apply a certain type of MLO, e.g., with respect to timing of transmissions on the involved links. Further, the AP MLD could change channel allocation depending on the received measurement reports. Still further, the AP MLD could control transmit processing on the involved links depending on the received measurement reports.

Figure 2:
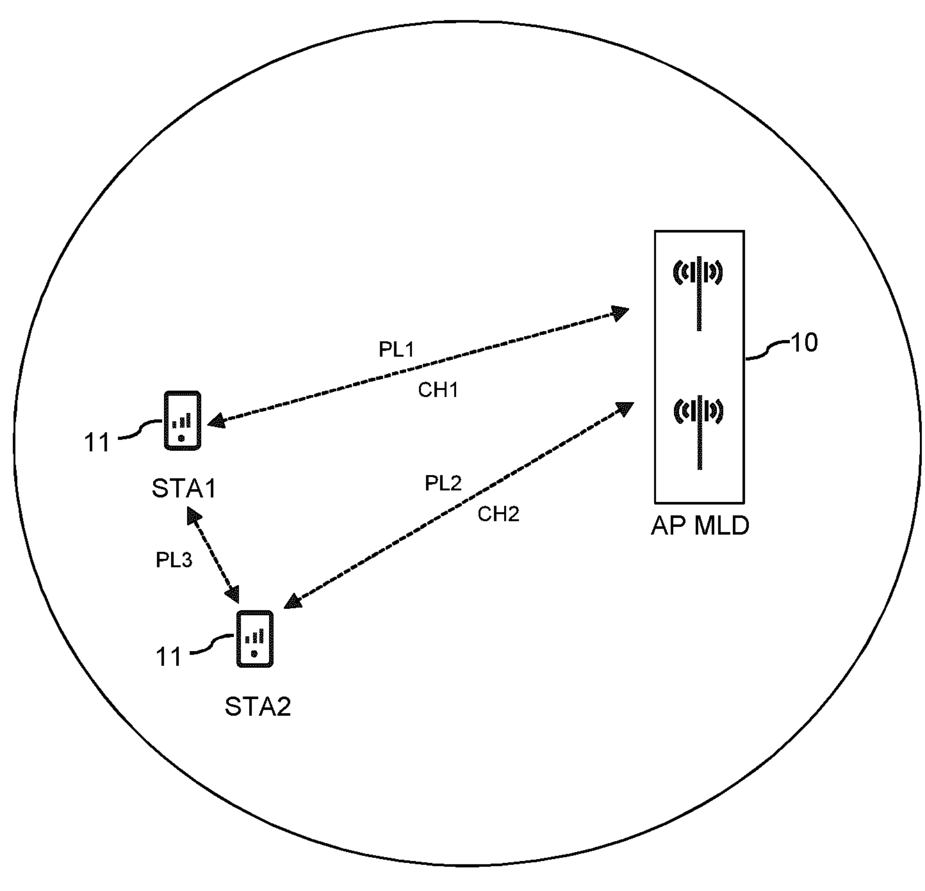
FIG. 2 schematically illustrates an example of a scenario involving MLO according to an embodiment.

FIG. 2 illustrates an exemplary scenario where the measurement report(s) provided according to the illustrated concepts may contribute to efficient control of MLO. The scenario of FIG. 2 involves an AP MLD 10, which may for example correspond to any of the APs 10 illustrated in FIG. 1. Further, the scenario of FIG. 2 involves two STAs 11 associated with the AP MLD 10, in particular a first STA 11, denoted as STA1, and a second STA 11, denoted as STA2. In the scenario of FIG. 2, a first link connects STA1 to the AP MLD 10, and a second link connects the STA2 to the AP MLD 10. The first link and the second link are maintained on different channels, denoted as CH1 and CH2, respectively. These different channels can for example be frequency channels from different frequency bands or different frequency channels within the same frequency band. In the scenario of FIG. 2, it is assumed that there is a risk of excessive cross-channel interference caused by an UL transmission.

When for example assuming that a distance between the AP MLD 10 and STA1 is approximately equal to a distance between the AP MLD 10 and the second STA2, e.g., about 10 m in each case, and that the STA1 and STA2 are located close to each other, e.g., with a distance between them being about 1 m, free-space path losses between the devices could be as follows: A free-space path loss PL1 between STA1 and the AP MLD 10 could be about 68 dB. Similarly, a free-space path loss PL2 between STA2 and the AP MLD 10 could be about 68 dB. Further, a free-space path loss PL3 between STA1 and STA2 could be about 48 dB.

In the case of STR MLO on CH1 and CH2, involving a DL transmission from the AP MLD 10 to STA1 over CH1 and a concurrent UL transmission from STA2 to the AP MLD over CH2, the UL transmission constitutes a potential source of interference for the reception of the DL transmission at STA1. If the TX power of the DL transmission is 20 dBm, the desired signal received power at STA1 over CH1 would be −48 dBm. Similarly, if the TX power of the UL transmission is 20 dBm, the interfering signal received power at STA1 from CH2 would be about −28 dBm. If CH2 rejection while receiving over CH1 at STA1 is assumed to be 40 dB, the interfering signal power at STA1 over CH1 is would be about −68 dBm. Thus, in the assumed example the SIR (signal-to-interference ratio) at STA1 would be about 20 dB. However, an MCS utilized on CH1 could require a higher SINR (signal-to-noise and interference ratio), so that reception failure for the DL transmission is likely even in the case of negligible noise contribution to the SINR. The situation would worsen for lower TX power of the DL transmission or higher value of PL1, or higher contribution of noise to the SINR.

In the illustrated concepts, a measurement report from STA1 can provide the AP MLD 10 with information concerning the cross-channel interference situation between CH1 and CH2. The above-described cross-channel interference problem can then be avoided by appropriate control of the MLO at the AP MLD 10. In particular, the AP MLD 10 could decide to use NSTR MLO on CH1 and CH2, specifically avoiding that DL transmission on CH1 occurs concurrently with ULtransmission on CH2, and vice versa. Alternatively or in addition, the AP MLD 10 could decide to change channel allocation of CH1 and/or CH2 or to adapt transmit processing of DL transmission on CH1 and/or transmit processing of UL transmission on CH2 to avoid or reduce cross-channel interference.

Figure 3:
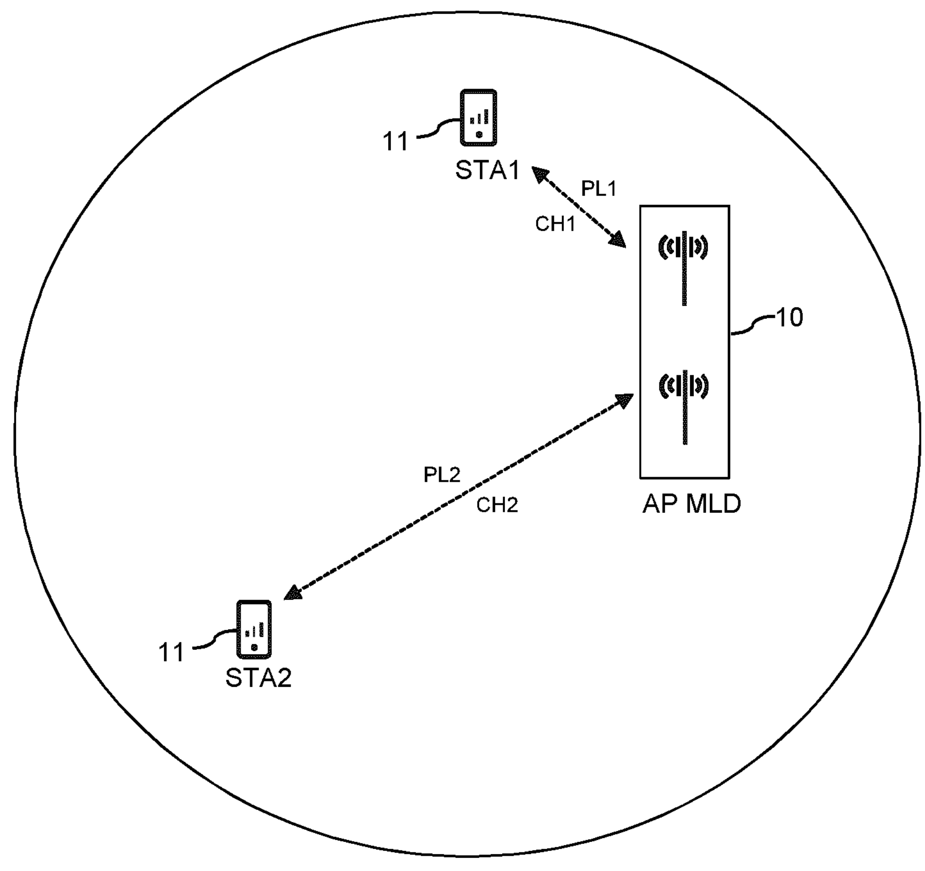
FIG. 3 schematically illustrates a further example of a scenario involving MLO according to an embodiment according to an embodiment.

FIG. 3 illustrates a further exemplary scenario where the measurement report(s) provided according to the illustrated concepts may contribute to efficient control of MLO. The scenario of FIG. 3 involves an AP MLD 10, which may for example correspond to any of the APs 10 illustrated in FIG. 1. Further, the scenario of FIG. 3 involves two STAs 11 associated with the AP MLD 10, in particular a first STA 11, denoted as STA1, and a second STA 11, denoted as STA2. In the scenario of FIG. 3, a first link connects STA1 to the AP MLD 10, and a second link connects the STA2 to the AP MLD 10. The first link and the second link are maintained on different channels, denoted as CH1 and CH2, respectively. These different channels can for example be frequency channels from different frequency bands or different frequency channels within the same frequency band. In the scenario of FIG. 3, it is assumed that there is a risk of excessive cross-channel interference caused by an DL transmission.

When for example assuming that a distance between the AP MLD 10 and STA1 is approximately 1 m and a distance between the AP MLD 10 and the second STA2 is significantly higher, e.g., about 10 m, free-space path losses between the devices could be as follows: A free-space path loss PL1 between STA1 and the AP MLD 10 could be about 48 dB. A free-space path loss PL2 between STA2 and the AP MLD 10 could be about 68 dB.

In the case of simultaneous DL MLO on CH1 and CH2, involving a DL transmission from the AP MLD 10 to STA1 over CH1 and a concurrent DL transmission from the AP MLD to STA2 over CH2, the DL transmission to STA2 constitutes a potential source of interference for the reception of the DL transmission at STA1. In particular, it could happen that a first TX power of the DL transmission to STA1 is lower than a second TX power of the DL transmission to STA2, because PL1 is lower than PL2. For example, the first TX power could be 0 dBm, resulting in a desired signal received power at STA1 over CH1 being about −48 dBm. Further, the second TX power could be 20 dBm, resulting in an interfering signal received power at STA1 from CH2 being about −28 dBm. If rejection of CH2 while receiving over CH1 at STA1 is assumed to be 40 dB, the interfering signal power at STA1 from CH1 would be about −68 dBm. Thus, the SIR at STA1 would be about 20 dB. However, an MCS utilized on CH1 could require a higher SINR, so that reception failure for the DL transmission on CH1 is likely even in the case of negligible noise contribution to the SINR. With higher contribution of noise to the SINR the situation would be even worse.

In the illustrated concepts, a measurement report from STA1 can provide the AP MLD 10 with information concerning the cross-channel interference situation between CH1 and CH2. The above-described cross-channel interference problem can then be avoided by appropriate control of the MLO at the AP MLD 10. In particular, the AP MLD 10 could decide to use non-simultaneous DL transmissions on CH1 and CH2, specifically avoiding that DL transmission on CH1 occurs concurrently with DL transmission on CH2, and vice versa. Alternatively or in addition, the AP MLD 10 could decide to change channel allocation of CH1 and/or CH2 or to adapt transmit processing of DL transmission on CH1 and/or transmit processing of DL transmission on CH2 to avoid or reduce cross-channel interference.

Figure 4:
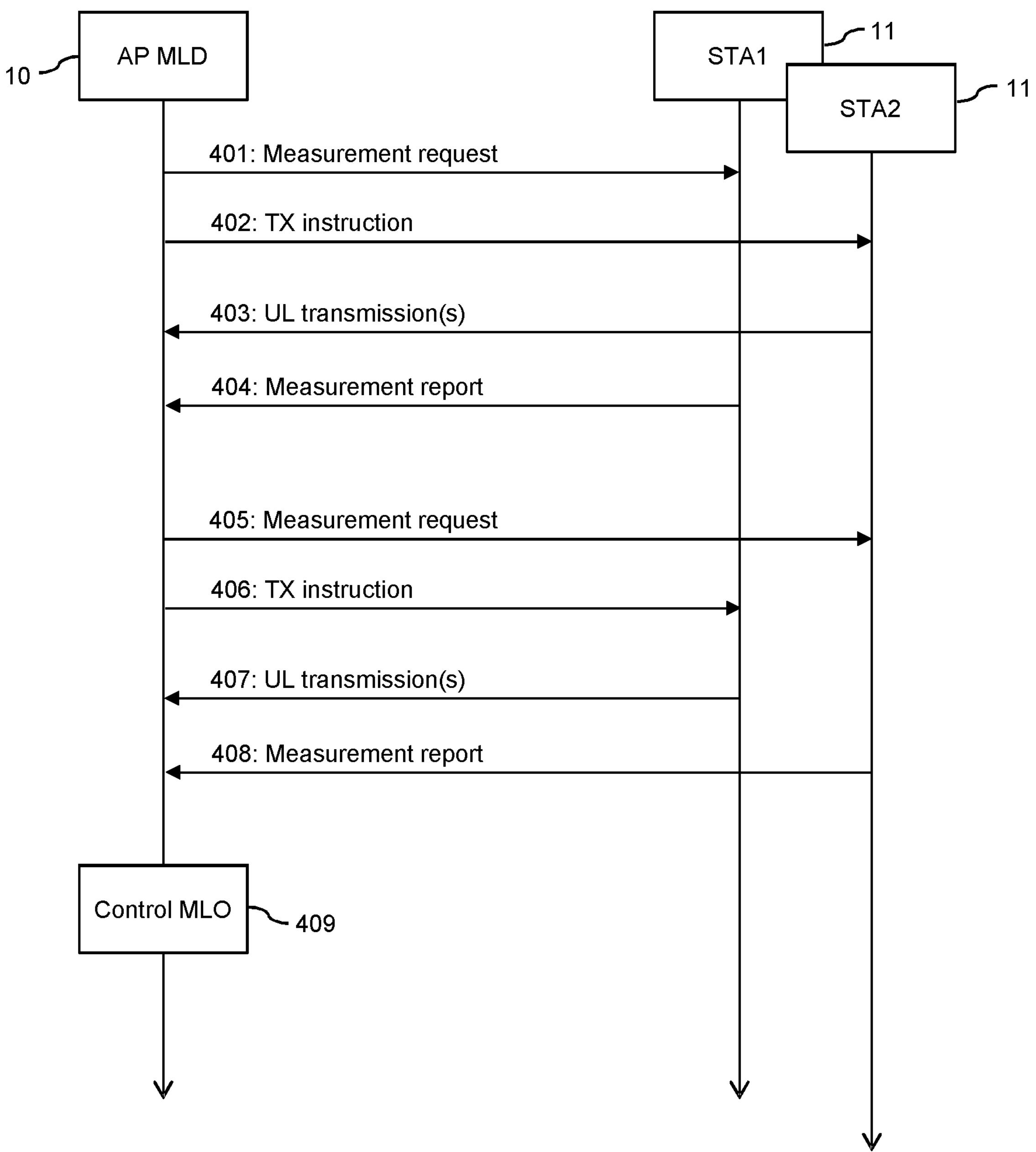
FIG. 4 shows an example of processes in which MLO is controlled according to an embodiment.

FIG. 4 shows an example of processes for requesting and reporting measurements according to the illustrated concepts. The processes of FIG. 4 involve an AP MLD 10, e.g., corresponding to one of the APs 10 illustrated in FIG. 1, a first STA 11, denoted as STA1, and a second STA 11, denoted as STA2. These STAs 11 may for example corresponding two of the STAs 11 illustrated in FIG. 1, to the STAs 11 of FIG. 2, or to the STAs 11 of FIG. 3. In the processes of FIG. 4, a first link connects STA1 to the AP MLD 10, and a second link connects the STA2 to the AP MLD 10. The first link and the second link are maintained on a first channel and a second channel, respectively. These different channels can for example be frequency channels from different frequency bands or different frequency channels within the same frequency band.

In the processes of FIG. 4, the AP MLD 10 may send a measurement request 401 to STA1. The measurement request 401 may request that STA1 performs one or more measurements on the first channel, to assess interference from the second channel. Further, the measurement request 401 may indicate a measurement configuration to be applied when performing the requested one or more measurements. The measurement configuration may indicate the channel on which the one or more measurements are to be performed and/or a time when the one or more measurements are to be performed. Further, the measurement configuration may indicate one or more measurement types to be performed, e.g., a measurement of interference power, RSSI (Received Signal Strength Indicator), or a noise histogram. The measurement configuration may also indicate one or more conditions for triggering the measurement.

Further, the measurement configuration could indicate one or more reference signals to be used in the one or more measurements. Further, the measurement request 401 may indicate a reporting configuration for reporting results of the one or more measurements, e.g., in terms of conditions for triggering sending of a measurement report and/or in terms of a quantity to be reported, e.g., for example, the reporting configuration could define reporting of measured interference power, RSSI, or a noise histogram and/or reporting of interference statistics based on multiple measurements of interference power.

The AP MLD 10 may further send a transmit (TX) instruction 402 to STA2. The transmit instruction 402 instructs STA2 to send one or more UL transmissions on the second channel. The transmit instruction 402 may indicate the channel on which the one or more UL transmissions are to be performed and/or a time when the one or more UL transmissions are to be performed. In some cases, the transmit instruction 402 may correspond to or include a trigger frame for triggering sending at least one of the one or more UL transmissions. In some cases, at least one of the one or more UL transmissions may correspond to a transmission which is dedicated to measurement purposes. In other cases, at least one of the one or more UL transmissions may also have the purpose of conveying user and/or control data from STA2 to the AP MLD 10. The one or more UL transmissions may include one or more reference signals enabling measurement of interference, and these one or more reference signals may be indicated by the transmit instruction 402.

As further illustrated, STA2 sends one or more UL transmissions 403 to the AP MLD 10. The one or more UL transmissions 403 are performed on the second channel. The one or more UL transmissions 403 may include at least one transmission which is dedicated for measurement purposes. In other cases, the one or more UL transmissions 403 may also include at least one transmission having the purpose of conveying user and/or control data from STA2 to the AP MLD 10. The one or more UL transmissions 403 may include one or more reference signals enabling measurement of interference, and these one or more reference signals may be indicated by the transmit instruction 402. STA2 may send the one or more UL transmissions 403 in response to an instruction or other trigger from the AP MLD 10, such as the above-mentioned transmit instruction 402. In other scenarios, sending of at least one of the one or more UL transmissions 403 may be initiated autonomously by STA2.

During the one or more UL transmissions 403, STA1 performs one or more measurements of interference on the first channel. Due to the one or more UL transmissions 403 being at least partially concurrent with the one or more measurements, the one or more measurements allow for detecting cross-channel interference imparted from the second channel onto the first channel. The one or more measurements may be based on one or more reference signals included in the one or more UL transmissions 403. The one or more measurements may be performed in response to a request from the AP MLD 10, e.g., in response to the above-mentioned measurement request 401. In other scenarios, the one or more measurements could be initiated autonomously by STA1. The one or more measurements may be based on a measurement configuration indicated by the AP MLD 10, e.g., indicated by the above-mentioned measurement request 401.

As further illustrated, STA1 sends a measurement report 404 to the AP MLD 10. The measurement report 404 indicates results of the one or more measurements performed by STA1, e.g., in terms of a measured interference power, RSSI, or a noise histogram and/or in terms of interference statistics. STA1 may send the measurement report 404 in response to a request from the AP MLD 10, e.g., in response to the above-mentioned measurement request 401. In other scenarios, sending of the measurement report 404 could be initiated autonomously by STA1. The measurement report 404 may be based on a reporting configuration indicated by the AP MLD 10, e.g., indicated by the above-mentioned measurement request 401.

Alternatively or in addition, the AP MLD 10 may send a measurement request 405 to STA2. The measurement request 405 may request that STA2 performs one or more measurements on the second channel, to assess interference from the first channel. Further, the measurement request 405 may indicate a measurement configuration to be applied when performing the requested one or more measurements. The measurement configuration may indicate the channel on which the one or more measurements are to be performed and/or a time when the one or more measurements are to be performed. Further, the measurement configuration may indicate one or more measurement types to be performed, e.g., a measurement of interference power, RSSI, or a noise histogram. The measurement configuration may also indicate one or more conditions for triggering the measurement. Further, the measurement configuration could indicate one or more reference signals to be used in the one or more measurements. Further, the measurement request 405 may indicate a reporting configuration for reporting results of the one or more measurements, e.g., in terms of conditions for triggering sending of a measurement report and/or in terms of a quantity to be reported, e.g., for example, the reporting configuration could define reporting of measured interference power, RSSI, or a noise histogram and/or reporting of interference statistics based on multiple measurements of interference power.

The AP MLD 10 may further send a transmit (TX) instruction 406 to STA1. The transmit instruction 406 instructs STA1 to send one or more UL transmissions on the first channel. The transmit instruction 406 may indicate the channel on which the one or more UL transmissions are to be performed and/or a time when the one or more UL transmissions are to be performed. In some cases, the transmit instruction 406 may correspond to or include a trigger frame for triggering sending at least one of the one or more UL transmissions. In some cases, at least one of the one or more UL transmissions may correspond to a transmission which is dedicated to measurement purposes. In other cases, at least one of the one or more UL transmissions may also have the purpose of conveying user and/or control data from STA1 to the AP MLD 10. The one or more UL transmissions may include one or more reference signals enabling measurement of interference, and these one or more reference signals may be indicated by the transmit instruction 406.

As further illustrated, STA1 sends one or more UL transmissions 407 to the AP MLD 10. The one or more UL transmissions 407 are performed on the first channel. The one or more UL transmissions 407 may include at least one transmission which is dedicated for measurement purposes. In other cases, the one or more UL transmissions 407 may also include at least one transmission having the purpose of conveying user and/or control data from STA1 to the AP MLD 10. The one or more UL transmissions 407 may include one or more reference signals enabling measurement of interference, and these one or more reference signals may be indicated by the transmit instruction 406. STA1 may send the one or more UL transmissions 407 in response to an instruction or other trigger from the AP MLD 10, such as the above-mentioned transmit instruction 407. In other scenarios, sending of at least one of the one or more UL transmissions 407 may be initiated autonomously by STA1.

During the one or more UL transmissions 407, STA2 performs one or more measurements of interference on the second channel. Due to the one or more UL transmissions 407 being at least partially concurrent with the one or more measurements, the one or more measurements allow for detecting cross-channel interference imparted from the first channel onto the second channel. The one or more measurements may be based on one or more reference signals included in the one or more UL transmissions 407. The one or more measurements may be performed in response to a request from the AP MLD 10, e.g., in response to the above-mentioned measurement request 405. In other scenarios, the one or more measurements could be initiated autonomously by STA2. The one or more measurements may be based on a measurement configuration indicated by the AP MLD 10, e.g., indicated by the above-mentioned measurement request 405.

As further illustrated, STA2 sends a measurement report 408 to the AP MLD 10. The measurement report 408 indicates results of the one or more measurements performed by STA2, e.g., in terms of a measured interference power, RSSI, or a noise histogram and/or in terms of interference statistics. STA2 may send the measurement report 408 in response to a request from the AP MLD 10, e.g., in response to the above-mentioned measurement request 405. In other scenarios, sending of the measurement report 408 could be initiated autonomously by STA2. The measurement report 408 may be based on a reporting configuration indicated by the AP MLD 10, e.g., indicated by the above-mentioned measurement request 405.

As further illustrated by block 409, the AP MLD then controls MLO with respect to STA1 and STA2 based on the measurement report 404 and/or based on the measurement report 408. For example, based on the measurement report(s) 404, 408, the AP MLD 10 could decide whether to use STR MLO or NSTR MLO on the first channel and/or on the second channel. When controlling the MLO, the AP MLD 10 may for example consider a path loss estimate between the AP MLD 10 and STA1, a path loss estimate between the AP MLD 10 and STA2, and/or a path loss estimate between STA1 and STA2. Such path loss estimates may be derived from the measurement report(s) 503 and/or 506. Further, the AP MLD 10 may consider a geometry of deployment and/or supported transmit processing capabilities of the respective STA, such as transmit beamforming, power control, available choice of MCS.

It is noted that the processes of FIG. 4 could be modified in various ways. For example, the measurement request 401 or the measurement request 405 could be omitted. The measurements by STA1 or STA2 could then be initiated in an autonomous manner by the respective STA. Further, the transmit instruction 402 or the transmit instruction 406 could be omitted. The UL transmissions by STA1 or STA2 could then be initiated in an autonomous manner by the respective STA. Further, it is noted that in some scenarios mutual measurements by both STA1 and STA2 could be utilized, while in other scenarios measurements could be performed and reported by either only STA1 or only STA2.

Figure 5:
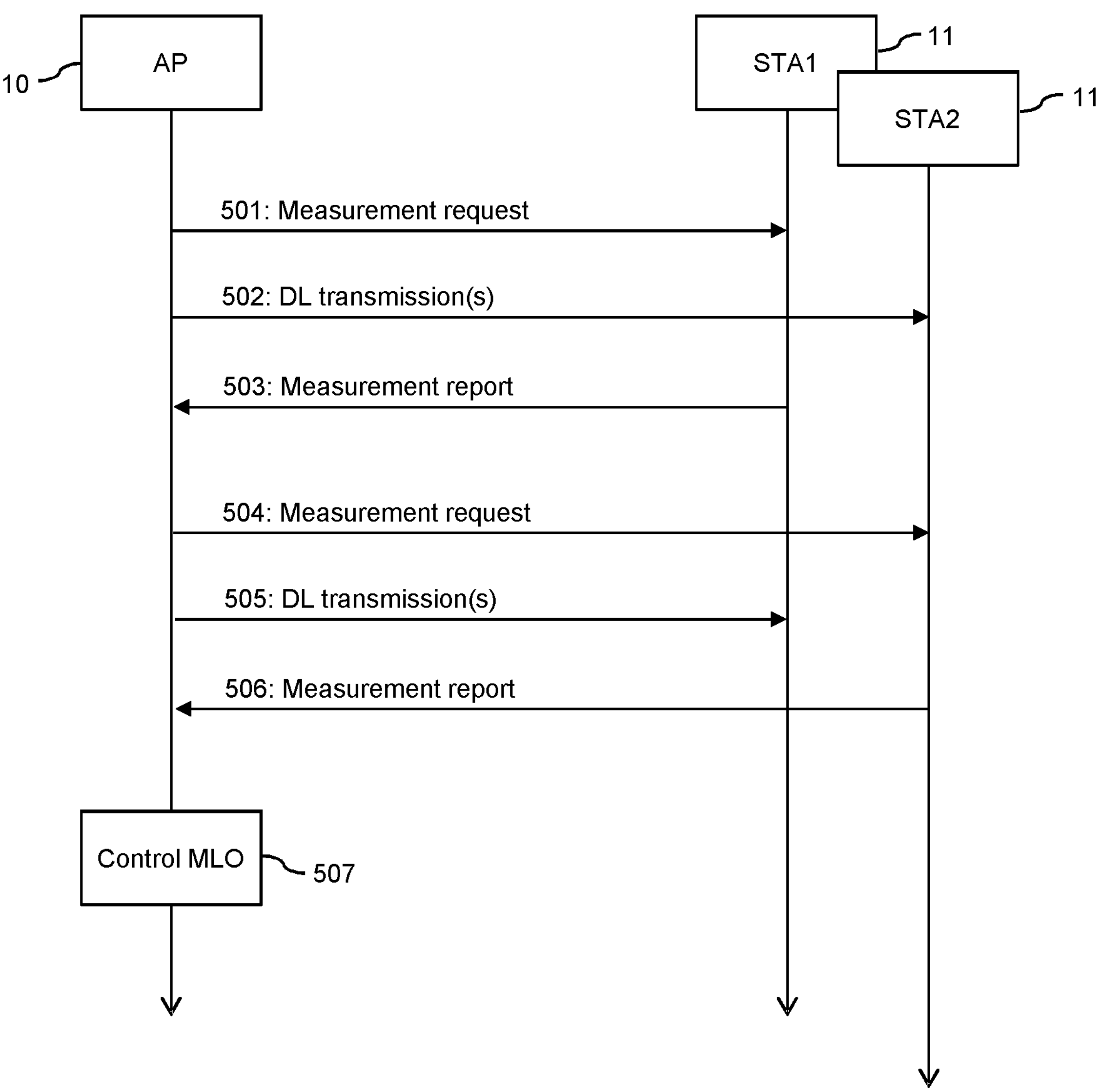
FIG. 5 shows a further example of processes in which MLO is controlled according to an embodiment.

FIG. 5 shows a further example of processes for requesting and reporting measurements according to the illustrated concepts. The processes of FIG. 5 involve an AP MLD 10, e.g., corresponding to one of the APs 10 illustrated in FIG. 1, a first STA 11, denoted as STA1, and a second STA 11, denoted as STA2. These STAs 11 may for example corresponding two of the STAs 11 illustrated in FIG. 1, to the STAs 11 of FIG. 2, or to the STAs 11 of FIG. 3. In the processes of FIG. 5, a first link connects STA1 to the AP MLD 10, and a second link connects the STA2 to the AP MLD 10. The first link and the second link are maintained on a first channel and a second channel, respectively. These different channels can for example be frequency channels from different frequency bands or different frequency channels within the same frequency band.

In the processes of FIG. 5, the AP MLD 10 may send a measurement request 501 to STA1. The measurement request 501 may request that STA1 performs one or more measurements on the first channel, to assess interference from the second channel. Further, the measurement request 501 may indicate a measurement configuration to be applied when performing the requested one or more measurements. The measurement configuration may indicate the channel on which the one or more measurements are to be performed and/or a time when the one or more measurements are to be performed. Further, the measurement configuration may indicate one or more measurement types to be performed, e.g., a measurement of interference power, RSSI, or a noise histogram. The measurement configuration may also indicate one or more conditions for triggering the measurement. Further, the measurement configuration could indicate one or more reference signals to be used in the one or more measurements. Further, the measurement request 501 may indicate a reporting configuration for reporting results of the one or more measurements, e.g., in terms of conditions for triggering sending of a measurement report and/or in terms of a quantity to be reported, e.g., for example, the reporting configuration could define reporting of measured interference power, RSSI, or a noise histogram and/or reporting of interference statistics based on multiple measurements of interference power.

As further illustrated, the AP MLD 10 sends one or more DL transmissions 502 to STA2. The one or more DL transmissions 502 are performed on the second channel. The one or more DL transmissions 502 may include at least one transmission which is dedicated for measurement purposes. In other cases, the one or more DL transmissions 502 may also include at least one transmission having the purpose of conveying user and/or control data from the AP MLD 10 to STA2. The one or more DL transmissions 502 may include one or more reference signals enabling measurement of interference.

During the one or more DL transmissions 502, STA1 performs one or more measurements of interference on the first channel. Due to the one or more DL transmissions 502 being at least partially concurrent with the one or more measurements, the one or more measurements allow for detecting cross-channel interference imparted from the second channel onto the first channel. The one or more measurements may be based on one or more reference signals included in the one or more DL transmissions 502. The one or more measurements may be performed in response to a request from the AP MLD 10, e.g., in response to the above-mentioned measurement request 501. In other scenarios, the one or more measurements could be initiated autonomously by STA1. The one or more measurements may be based on a measurement configuration indicated by the AP MLD 10, e.g., indicated by the above-mentioned measurement request 501.

As further illustrated, STA1 sends a measurement report 503 to the AP MLD 10. The measurement report 503 indicates results of the one or more measurements performed by STA1, e.g., in terms of a measured interference power, RSSI, or a noise histogram and/or in terms of interference statistics. STA1 may send the measurement report 503 in response to a request from the AP MLD 10, e.g., in response to the above-mentioned measurement request 501. In other scenarios, sending of the measurement report 503 could be initiated autonomously by STA1. The measurement report 503 may be based on a reporting configuration indicated by the AP MLD 10, e.g., indicated by the above-mentioned measurement request 501.

Alternatively or in addition, the AP MLD 10 may send a measurement request 504 to STA2. The measurement request 504 may request that STA2 performs one or more measurements on the second channel, to assess interference from the first channel. Further, the measurement request 504 may indicate a measurement configuration to be applied when performing the requested one or more measurements. The measurement configuration may indicate the channel on which the one or more measurements are to be performed and/or a time when the one or more measurements are to be performed. Further, the measurement configuration may indicate one or more measurement types to be performed, e.g., a measurement of interference power, RSSI, or a noise histogram. The measurement configuration may also indicate one or more conditions for triggering the measurement. Further, the measurement configuration could indicate one or more reference signals to be used in the one or more measurements. Further, the measurement request 504 may indicate a reporting configuration for reporting results of the one or more measurements, e.g., in terms of conditions for triggering sending of a measurement report and/or in terms of a quantity to be reported, e.g., for example, the reporting configuration could define reporting of measured interference power, RSSI, or a noise histogram and/or reporting of interference statistics based on multiple measurements of interference power.

As further illustrated, the AP MLD 10 sends one or more DL transmissions 505 to STA1. The one or more DL transmissions 505 are performed on the first channel. The one or more DL transmissions 505 may include at least one transmission which is dedicated for measurement purposes. In other cases, the one or more DL transmissions 505 may also include at least one transmission having the purpose of conveying user and/or control data from the AP MLD 10 to STA1. The one or more DL transmissions 505 may include one or more reference signals enabling measurement of interference.

During the one or more DL transmissions 505, STA2 performs one or more measurements of interference on the second channel. Due to the one or more DL transmissions 505 being at least partially concurrent with the one or more measurements, the one or more measurements allow for detecting cross-channel interference imparted from the first channel onto the second channel. The one or more measurements may be based on one or more reference signals included in the one or more DL transmissions 505. The one or more measurements may be performed in response to a request from the AP MLD 10, e.g., in response to the above-mentioned measurement request 505. In other scenarios, the one or more measurements could be initiated autonomously by STA2. The one or more measurements may be based on a measurement configuration indicated by the AP MLD 10, e.g., indicated by the above-mentioned measurement request 504.

As further illustrated, STA2 sends a measurement report 506 to the AP MLD 10. The measurement report 506 indicates results of the one or more measurements performed by STA2, e.g., in terms of a measured interference power, RSSI, or a noise histogram and/or in terms of interference statistics. STA2 may send the measurement report 506 in response to a request from the AP MLD 10, e.g., in response to the above-mentioned measurement request 504. In other scenarios, sending of the measurement report could be initiated autonomously by STA2. The measurement report 506 may be based on a reporting configuration indicated by the AP MLD 10, e.g., indicated by the above-mentioned measurement request 504.

As further illustrated by block 507, the AP MLD then controls MLO with respect to STA1 and STA2 based on the measurement report 503 and/or based on the measurement report 506. For example, based on the measurement report(s) 503, 506, the AP MLD 10 could decide whether to use simultaneous DL MLO on the first channel and the second channel. When controlling the MLO, the AP MLD 10 may for example consider a path loss estimate between the AP MLD 10 and STA1, a path loss estimate between the AP MLD 10 and STA2, and/or a path loss estimate between STA1 and STA2. Such path loss estimates may be derived from the measurement report(s) 503 and/or 506. Further, the AP MLD 10 may consider a geometry of deployment and/or supported transmit processing capabilities of the respective STA, such as transmit beamforming, power control, available choice of MCS.

It is noted that the processes of FIG. 5 could be modified in various ways. For example, the measurement request 501 or the measurement request 504 could be omitted. The measurements by STA1 or STA2 could then be initiated in an autonomous manner by the respective STA. Further, it is noted that in some scenarios mutual measurements by both STA1 and STA2 could be utilized, while in other scenarios measurements could be performed and reported by either only STA1 or only STA2.

In some scenarios, measurements on UL transmissions like in the processes of FIG. 4 could also be combined with measurements on DL transmissions like in the processes of FIG. 5. In such cases, it would also be possible that the same measurement report includes results which are based on measurements on UL transmissions and on DL transmissions.

In accordance with the above concepts, a measurement protocol for assessment of cross-channel interference in MLO of an AP MLD could operate as follows:

A STA associated with an AP MLD performs a measurement on a first channel during a concurrent transmission on a second channel. The first channel is the operating channel of the STA, and the second channel is the operating channel of another STA associated with the AP MLD. The STA may perform the measurement autonomously or in response to receiving a request from the AP MLD to perform the measurement. The measurement may be based on measuring an RSSI on the first channel during a concurrent transmission over the second channel. A duration of the RSSI measurement may correspond to an approximate duration of the concurrent transmission over the second channel.

In addition or as an alternative to measuring the RSSI, the measurement could be based on measuring noise on the first channel during a concurrent transmission over the second channel. Such measurement of noise could for example be requested using a Noise Histogram Request/Report frame as specified in the IEEE WLAN standard. Parts of existing measurement protocols could thus be reused to enable measurement and reporting of cross-channel interference. In that case, the measured noise component would include the cross-channel interference caused by the concurrent transmission over the second channel. A measurement duration of the Noise Histogram may correspond to an approximate duration of the concurrent transmission over the second channel.

The reporting of the measurement by the STA can be implemented in various ways. For example, the STA may autonomously send a measurement report indicating a result of the measurement to the AP MLD. Alternatively, the AP MLD could trigger the STA to send a measurement report indicating a result of the measurement to the AP MLD.

Based on the measurement report received from the STA, the AP MLD can assess the cross-channel interference rejection capability of the STA and use that to assess if a cross-channel interference problem would occur at the STA with respect to the first channel during MLO based on the first channel and the second channels.

As mentioned above, the measurement results are used by the AP MLD to control the MLO, e.g., by selecting an appropriate type of MLO. Further, the AP MLD can use the measurement results as input to a channel allocation algorithm, with the aim of allocating channels to its associated STAs in such a way that the cross-channel interference problems are avoided or at least reduced. Here, it is noted that it may occur that allocating the channels in such a way that cross-channel interference is negligible is difficult or even impossible, e.g., due to a typically highly dynamic nature of channel availability and channel quality. Even in such cases, problems due to the cross-channel interference can be avoided by selecting an appropriate type of MLO based on the measurement results and/or by controlling how a specific type of MLO is applied. In some situations, the AP MLD could even decide to refrain from using MLO on certain channels. For example, when referring to the scenario of FIG. 2, the AP MLD 10 could decide based on the measurement results whether to utilize one of the following types of MLO with respect to STA1 and STA2: (A) simultaneous DL MLO, (B) simultaneous UL MLO, and (C) simultaneous DL and UL MLO. Further, in each case, the measurement results may be used to decide how the respective type of MLO is applied.

In a scenario like illustrated in FIG. 2, the AP MLD 10 may try to identify and assess using the measurement results whether an UL transmission by one non-AP STA over one channel may cause a cross-channel interference problem for a concurrent DL reception at the other non-AP STA over the other channel.

When assuming a scenario as illustrated in FIG. 2, the measurement results may be used to control simultaneous DL MLO of the AP MLD 10 with respect to STA1 and STA2 in the following way: In a first case, if based on the measurement results the AP MLD 10 determines that a cross-channel interference problem would not occur at any of STA1 and STA2, irrespectively of the TX power used for the UL transmission and irrespectively of MCS used for the DL transmission, the AP MLD may decide to perform DL transmissions to STA1 and STA2 in an unsynchronized and independent manner, without any risk that a BA transmission by one of the STAs could interfere with the reception of a DL transmission by the other STA. In a second case, if based on the measurement results the AP MLD 10 determines that a cross-channel interference problem may occur at one of the STAs, in the following denoted as vulnerable STA, the AP MLD 10 can prevent such problem by performing DL transmission to STA1 and STA2 in a synchronized simultaneous manner. In this way, the AP MLD 10 can ensure that the DL transmission to the vulnerable STA finishes before or together with a DL transmission to the other STA, such that transmission of a BA by the non-vulnerable STA would not occur during the DL transmission to the vulnerable STA. In some cases, the AP MLD 10 may extend the duration of the PPDU transmitted to the non-vulnerable STA, e.g., by employing a suitable padding procedure as for example specified in the IEEE WLAN standard or in "IEEE P802.11ax/D7.0 Draft Standard for Information technology—Telecommunications and information exchange between systems Local and metropolitan area networks-Specific requirements Part 11: Wireless LAN Medium Access Control (MAC) and Physical Layer (PHY) Specifications Amendment 1: Enhancements for High Efficiency WLAN (November 2020)", in the following denoted as HE (High Efficiency) draft amendment. In a third case, if based on the measurement results the AP MLD 10 determines that a cross-channel interference problem can occur at both the STAs, the AP MLD 10 may prevent such problems by performing DL transmissions to STA1 and STA2 in a synchronized and simultaneous manner. For example, the AP MLD 10 can enforce PPDU time-alignment solution to ensure that transmission of a BA by any of the STAs does not occur during a DL transmission to the other STA. One example of such a time-alignment solution is the PPDU end-time alignment solution as specified in the EHT draft amendment.

For the above-mentioned second case or third case, as an alternative or in addition to synchronizing the DL transmissions, the AP MLD 10 could also adapt transmit processing of the DL transmissions to the vulnerable STA(s). For example, the AP MLD 10 could adapt transmit power control, MCS selection, and/or transmit beamforming to improve robustness of these DL transmissions. For example, the AP MLD 10 could choose a robust low data-rate MCS and high transmit power that would enable successful reception at the vulnerable STA even in the presence of cross-channel interference.

If in the above-mentioned second case or third case the AP MLD 10 cannot avoid the occurrence of a cross-channel interference problem by synchronization of DL transmissions or adaptation of transmit processing, the AP MLD 10 could also decide to refrain from using simultaneous DL MLO and instead select using non-simultaneous DL transmissions, involving sequential, one-at-a-time DL transmission to the two STAs.

When assuming a scenario as illustrated in FIG. 2, the measurement results may be used to control simultaneous UL MLO of the AP MLD 10 with respect to STA1 and STA2 in the following way: In a first case, if based on the measurement results the AP MLD 10 determines that a cross-channel interference problem would not occur at any of the two STAs irrespectively of the TX power used for the UL transmissions or of the MCS used for the DL transmissions, the AP MLD 10 can allow completely unsynchronized and independent UL transmissions from STA1 and STA2, without a risk that an UL transmission by one of the STAs would interfere with the transmission of a BA to the other. In a second case, if based on the measurement results the AP MLD 10 determines that a cross-channel interference problem can occur at one of the STAs, in the following denoted as vulnerable STA, the AP MLD 10 can avoid the cross-channel interference problem by mandating UL transmissions from STA1 and STA2 to be performed in a synchronized and simultaneous manner. For example, the AP MLD can trigger the UL transmission from the vulnerable STA in such a way that it does not finish before the UL transmission by the other STA. This may ensure that transmission of a BA to the vulnerable STA does not occur during an UL transmission by the other STA. In some cases, the AP MLD 10 may also request the vulnerable STA to extend the duration of its UL PPDU, using a padding procedure as for example specified in the HE draft amendment. In a third case, if based on the measurement results the AP MLD 10 determines that a cross-channel interference problem may occur at both the STAs, the AP MLD can avoid the cross-channel interference problem by undertaking mandating UL transmissions from STA1 and STA2 to be performed in a synchronized and simultaneous manner. For example, the AP MLD 10 can trigger the UL transmissions from the two STAs in such a way that the end-times of the UL transmissions from both STAs are aligned so that the subsequent transmission of BAs would also be aligned with each other. In some cases, the AP MLD 10 may also request the STAs to extend the duration of their respective UL PPDU, using a padding procedure as for example specified in the HE draft amendment, so that end-times of the PPDUs become aligned.

For the above-mentioned second case or third case, as an alternative or in addition to synchronizing the UL transmissions, the AP MLD 10 could also request or instruct the STA(s) to adapt transmit processing of the UL transmissions to reduce the generated cross-channel interference. For example, the AP MLD 10 could request or instruct the STA(s) to adapt transmit power control, MCS selection, and/or transmit beamforming to reduce cross-channel interference caused by these UL transmissions. For example, the AP MLD 10 could request or instruct the STA(s) to choose a lower transmit power and/or a more focused transmit beamforming.

If in the above-mentioned second case or third case the AP MLD 10 cannot avoid the occurrence of a cross-channel interference problem by synchronization of DL transmissions or adaptation of transmit processing, the AP MLD 10 could also decide to refrain from using simultaneous UL MLO and instead select using non-simultaneous UL transmissions, involving sequential, one-at-a-time UL transmission from the two STAs. This can for example be achieved by the AP MLD 10 mandating an RTS (request-to-send)/CTS (clear-to-send) for UL transmissions and appropriately controlling the sending of CTS frames by the AP MLD 10. In such case, the STA which intends to send a UL transmission would send an RTS frame, and the AP MLD 10 may respond with a CTS frame when the corresponding UL transmission would not cause excessive cross-channel interference to transmission of a BA to a vulnerable STA. On the other hand, the AP MLD 10 could choose to not respond with a CTS frame when there is an excessive risk that the corresponding UL transmission would cause reception failure of a BA at a vulnerable STA or could choose to send the CTS frame later, when the risk that the corresponding UL transmission would cause reception failure of a BA at a vulnerable STA no longer exists.

When assuming a scenario as illustrated in FIG. 2, the measurement results may be used to control simultaneous DL and UL MLO of the AP MLD 10 with respect to STA1 and STA2 in the following way: In a first case, if based on the measurement results the AP MLD 10 determines that a cross-channel interference problem would not occur at any of the two STAs irrespectively of the TX power used for the UL transmissions or of the MCS used for the DL transmissions, the AP MLD 10 can apply completely unsynchronized and independent simultaneous DL and UL MLO involving STA1 and STA2, without excessive risk that an UL transmission by one of the STAs would interfere with a DL transmission to the other STA. In a second case, if based on the measurement results the AP MLD 10 determines that a cross-channel interference problem may occur at one of the STAs, in the following denoted as vulnerable STA, the AP MLD 10 can avoid the cross-channel interference problem by not using simultaneous DL and UL MLO involving the two STAs. To achieve this, the AP MLD 10 may mandate only triggered UL channel access by the STA that would cause the cross-channel interference. This may help to avoid occurrence of an interfering UL transmission during an ongoing DL transmission to the vulnerable STA. Alternatively, if the STA causing the cross-channel interference is already transmitting, the AP MLD 10 could choose to refrain from performing a simultaneous DL transmission to the vulnerable STA and for example delay a DL transmission to the vulnerable STA until after the end of the UL transmission causing the cross-channel interference. In a third case, if based on the measurement results the AP MLD 10 determines that a cross-channel interference problem may occur at both the STAs, the AP MLD 10 can avoid the cross-channel interference by not using simultaneous DL and UL MLO involving the two STAs. To achieve this, the AP MLD may mandate only triggered UL channel access by the STAs. This may help to avoid occurrence an interfering UL transmission during an ongoing DL transmission to one of the STAs. Alternatively, if one of the STAs is already transmitting, the AP MLD 10 could choose to refrain from performing a simultaneous DL transmission to the other STA and for example delay a DL transmission to the other STA until after the end of the UL transmission causing the cross-channel interference.

For the above-mentioned second case or third case, as an alternative or in addition to mandating triggered UL channel access, the AP MLD 10 could also request or instruct the STA(s) to adapt transmit processing of the UL transmissions to reduce the generated cross-channel interference. For example, the AP MLD 10 could request or instruct the STA(s) to adapt transmit power control, MCS selection, and/or transmit beamforming to reduce cross-channel interference caused by these UL transmissions. For example, the AP MLD 10 could request or instruct the STA(s) to choose a lower transmit power and/or a more focused transmit beamforming. In addition or as an alternative, the AP MLD 10 could transmit processing of the DL transmissions to the vulnerable STA(s). For example, the AP MLD 10 could adapt transmit power control, MCS selection, and/or transmit beamforming to improve robustness of these DL transmissions. For example, the AP MLD 10 could choose a robust low data-rate MCS and high transmit power that would enable successful reception at the vulnerable STA even in the presence of cross-channel interference.

Mandating only triggered UL channel access by the STAs may result in lower channel access opportunities for the STAs. Accordingly, as an alternative to mandating triggered UL channel access, the AP MLD 10 could control the timing of UL channel access by the STA(s) in another way. For example, the AP MLD 10 could use dynamic on-the-fly channel access decisions and allow the possibility of UL channel access whenever a STA would gain access to the channel. To achieve this, the AP MLD 10 could mandate an RTS/CTS frame exchange for UL transmissions and then control the sending of CTS frames by the AP MLD 10 in an appropriate manner. In such case, the STA which intends to send a UL transmission would send an RTS frame, and the AP MLD 10 may respond with a CTS frame if the corresponding UL transmission would not cause excessive cross-channel interference on a DL transmission to a vulnerable STA. On the other hand, the AP MLD 10 could choose to not respond with a CTS frame when there is an excessive risk that the corresponding UL transmission would cause reception failure of a DL transmission at a vulnerable STA or could choose to send the CTS frame later, when the risk that the corresponding UL transmission would cause reception failure of a DL transmission at a vulnerable STA no longer exists.

Similar solutions for controlling MLO based on the measurement results can also be applied in various other scenarios, e.g., in a scenario as illustrated in FIG. 3, where a DL transmission to STA1 from the AP MLD 10 may be affected by cross-channel interference resulting from a DL transmission to STA2 from the AP MLD 10.

When assuming a scenario as illustrated in FIG. 3, the measurement results may be used to control simultaneous UL MLO of the AP MLD 10 with respect to STA1 and STA2 in the following way: In a first case, if based on the measurement results the AP MLD 10 determines that a cross-channel interference problem would not occur irrespectively of the TX power or of the MCS used for the DL transmissions, the AP MLD 10 can allow completely unsynchronized and independent UL transmissions from STA1 and STA2, without a risk that a DL transmission to one of the STAs would interfere with a DL transmission to the other STA. In a second case, if based on the measurement results the AP MLD 10 determines that a cross-channel interference problem can occur for a DL transmission to one of the STAs, in the following denoted as vulnerable STA, the AP MLD 10 can avoid the cross-channel interference problem by mandating UL transmissions from STA1 and STA2 to be performed in a synchronized manner. For example, the AP MLD 10 can trigger the UL transmission from the vulnerable STA in such a way that it finishes before the UL transmission by the other STA. This may ensure that transmission of a BA to the other STA does not occur during a BA transmission to the vulnerable STA. In some cases, the AP MLD 10 may also request the non-vulnerable STA to extend the duration of its UL PPDU, using a padding procedure as for example specified in the HE draft amendment, to ensure that the corresponding BA transmission to the non-vulnerable STA does not occur during a BA transmission to the vulnerable STA. In a third case, if based on the measurement results the AP MLD 10 determines that a cross-channel interference problem may occur at both the STAs, the AP MLD 10 can avoid the cross-channel interference by mandating UL transmissions from STA1 and STA2 to be performed in a synchronized manner. For example, the AP MLD 10 can trigger the UL transmissions from the two STAs in such a way that they do not end at the same time, to ensure that the corresponding BA transmissions from the AP MLD 10 do not occur at the same time.

When assuming a scenario as illustrated in FIG. 3, the measurement results may be used to control simultaneous DL MLO of the AP MLD 10 with respect to STA1 and STA2 in the following way: In a first case, if based on the measurement results the AP MLD 10 determines that a cross-channel interference problem would not occur irrespectively of the TX power or of the MCS used for the DL transmissions, the AP MLD 10 can perform completely unsynchronized and independent DL transmissions to STA1 and STA2, without a risk that a DL transmission to one of the STAs would interfere with a DL transmission to the other STA.

In a second case, if based on the measurement results the AP MLD 10 determines that a cross-channel interference problem for one of the STAs, in the following denoted as vulnerable STA, can be caused by a DL transmission to the other STA, the AP MLD 10 can avoid the cross-channel interference problem by performing DL transmissions to STA1 and STA2 in a synchronized manner. For example, the AP MLD 10 can perform the DL transmission to the vulnerable STA in such a way that it starts and finishes before the DL transmission to the other STA. This may ensure that a DL transmission to the vulnerable STA does not occur during a DL transmission to the other STA. In some cases, the AP MLD 10 may also delay the intended DL transmission to the non-vulnerable STA to ensure it does not occur during an ongoing DL transmission to the vulnerable STA. In a third case, if based on the measurement results the AP MLD 10 determines that a cross-channel interference problem may occur at both the STAs, the AP MLD 10 can avoid the cross-channel interference by not using simultaneous DL MLO involving the two STAs, and instead perform non-simultaneous DL transmissions, involving sequential, one-at-a-time DL transmission to the two STAs.

When assuming a scenario as illustrated in FIG. 3, the measurement results may be used to control simultaneous DL and UL MLO of the AP MLD 10 with respect to STA1 and STA2 in the following way: In a first case, if based on the measurement results the AP MLD 10 determines that a cross-channel interference problem would not occur irrespectively of the TX power or of the MCS used for the DL transmissions, the AP MLD 10 can apply completely unsynchronized and independent simultaneous DL and UL MLO involving STA1 and STA2, without excessive risk that a DL transmission to one of the STAs would interfere with a DL transmission to the other STA. In a second case, if based on the measurement results the AP MLD 10 determines that a cross-channel interference problem for one of the STAs, in the following denoted as vulnerable STA, can be caused by a DL transmission to the other STA, the AP MLD 10 can avoid the cross-channel interference problem by ensuring that the UL transmission from the non-vulnerable STA finishes after the DL transmission to the vulnerable STA, such that the BA transmission to the non-vulnerable STA does not occur during the DL transmission to the vulnerable STA. In some cases, the AP MLD 10 may request the non-vulnerable STA to extend the duration of its UL PPDU, using a padding procedure as for example specified in the HE draft amendment, to ensure that the corresponding BA transmission from the AP MLD 10 does not occur during the DL transmission to the vulnerable STA. In a third case, if based on the measurement results the AP MLD 10 determines that a cross-channel interference problem may occur at both the STAs, the AP MLD 10 can avoid the cross-channel interference by mandating the DL and UL transmissions to be performed in a synchronized manner. For example, the AP MLD 10 can perform the DL transmission to one STA in such a way that it does not occur during a BA transmission to the other STA.

Also in such scenarios considering cross-channel interference caused by a DL transmission to a non-vulnerable STA to a DL transmission to a vulnerable STA, the control of the MLO may also involve that, depending on the measurement results, transmit processing of the DL transmissions is adapted depending on the measurement results. For example, the AP MLD 10 could choose a lower transmit power and/or a more focused transmit beamforming for the DL transmission to the non-vulnerable STA to reduce the cross-channel interference. Alternatively or in addition, the AP MLD 10 could choose a higher transmit power and/or a more focused transmit beamforming for the DL transmission to the vulnerable STA to increase its robustness.

Figure 6:
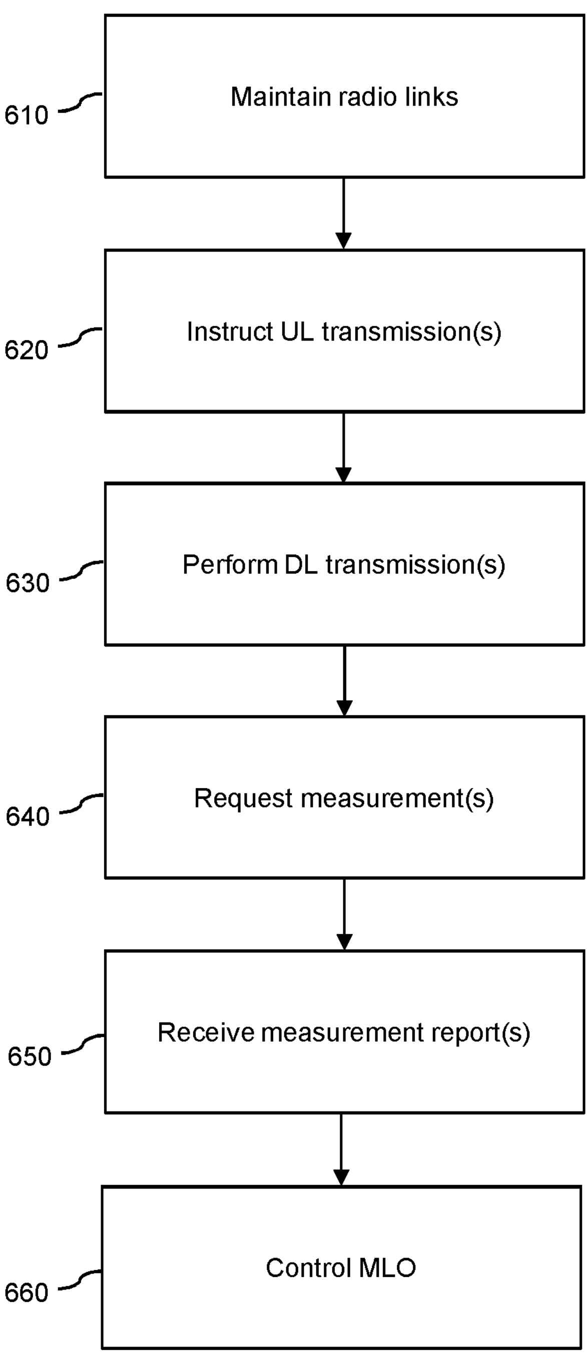
FIG. 6 shows a flowchart for schematically illustrating a method according to an embodiment.

FIG. 6 shows a flowchart for illustrating a method, which may be utilized for implementing the illustrated concepts. The method of FIG. 6 may be used for implementing the illustrated concepts in an AP of a wireless communication system, e.g., any of the above-mentioned APs 10. The wireless communication system may be based on a WLAN technology, e.g., according to the IEEE 802.11 standards family.

If a processor-based implementation of the AP is used, at least some of the steps of the method of FIG. 6 may be performed and/or controlled by one or more processors of the AP. Such AP may also include a memory storing program code for implementing at least some of the below described functionalities or steps of the method of FIG. 6.

At step 610, the AP maintains a first wireless link to a first wireless station and a second wireless link to a second wireless station. The first wireless station and the second wireless station may for example correspond to any of the above-mentioned STAs 11. The first wireless link is maintained on a first channel, and the second wireless link is maintained on a second channel. The first and second channel are different from each other, e.g., correspond to different frequency channels from the same frequency band or from different frequency bands.

At step 620, the AP may instruct the second wireless station to perform an UL transmission on the second channel. In some scenarios, the AP may also instruct the first wireless station to perform a UL wireless transmission on the first channel. For instructing the wireless station(s) to perform the UL wireless transmission(s), the AP may send transmit instructions as for example explained in connection with FIG. 4. The UL wireless transmissions could for example correspond to one or more of the UL transmissions in the processes of FIG. 4.

At step 630, the AP may perform a DL wireless transmission to the first wireless station. In some scenarios, the AP may also perform a DL wireless transmission to the second wireless station. For example, the DL wireless transmission(s) could correspond to one or more of the DL transmissions in the processes of FIG. 5.

At step 640, the AP may request first wireless station to perform one or more measurements of the level of interference on the first channel. In particular, the AP may request the first wireless station to perform at least one of the one or more measurements concurrently with a UL wireless transmission on the second channel, e.g., the UL wireless transmission instructed to be performed at step 620. Further, the AP may request the first wireless station to perform at least one of the one or more measurements concurrently with a DL wireless transmission on the second channel, e.g., one of the DL wireless transmission performed at step 630.

In addition, step 640 may involve that the AP requests second wireless station to perform a measurement of the level of interference on the first channel. In particular, the AP may request the second wireless station to perform the measurement concurrently with a UL wireless transmission on the first channel, e.g., the UL wireless transmission instructed to be performed at step 620. Further, the AP may request the second wireless station to perform at least one of the one or more measurements concurrently with a DL wireless transmission on the first channel, e.g., one of the DL wireless transmission performed at step 630.

Further, step 640 may involve that the AP requests the first wireless station to send a measurement report based on the requested measurement(s).

Further, step 640 may involve that the AP requests the second wireless station to send a measurement report based on the requested measurement(s).

At step 650, the AP receives a measurement report from the first wireless station. The measurement report represents a level of interference from the second channel to the first channel. In some cases, the measurement report may represent the level of interference in terms of an RSSI. Alternatively or in addition, the measurement report may represent the level of interference in terms of a noise histogram, an interference power level, and/or interference statistics.

The measurement report may be based on at least one measurement performed by the first wireless station on the first channel during at least one wireless transmission on the second channel. The at least one wireless transmission on the second channel may for example include a UL wireless transmission from the second wireless station to the AP. Such UL wireless transmission may be performed in response to the instruction of step 620. Alternatively or in addition, the at least one wireless transmission on the second channel may include a DL wireless transmission from the AP to the second wireless station, e.g., as performed at step 630.

In some scenarios, the AP may receive the measurement report in response to a request from the AP, e.g., in response to the request of step 640. Alternatively, the first wireless station could autonomously send the measurement report. For example, sending of the measurement report could be triggered by an event detected by the first wireless station, such as the measured level of interference on the first channel exceeding a threshold. In some scenarios, the measurement report may be based on a measurement of the level of interference by the first wireless station during a UL wireless transmission on the second channel, e.g., the UL wireless transmission instructed at step 620, and this measurement may be performed autonomously by the first wireless station. In some scenarios, the measurement report may be based on a measurement of the level of interference by the first wireless station during a UL wireless transmission on the second channel, e.g., the UL wireless transmission instructed at step 620, and this measurement may be performed in response to a request from the AP, e.g., the request of step 640. In some scenarios, the measurement report may be based on a measurement of the level of interference by the first wireless station during a DL wireless transmission on the second channel, e.g., the DL wireless transmission performed at step 630, and this measurement may be performed autonomously by the first wireless station. In some scenarios, the measurement report may be based on a measurement of the level of interference by the first wireless station during a DL wireless transmission on the second channel, e.g., the DL wireless transmission performed at step 630, and this measurement may be performed in response to a request from the AP, e.g., the request of step 640.

In some scenarios, step 650 may involve that the AP receives a further measurement report from the second wireless station. The further measurement report represents a level of interference from the first channel to the second channel. In some cases, the further measurement report may represent the level of interference in terms of an RSSI. Alternatively or in addition, the further measurement report may represent the level of interference in terms of a noise histogram, an interference power level, and/or interference statistics.

The further measurement report may be based on at least one measurement performed by the second wireless station on the second channel during at least one wireless transmission on the first channel. The at least one wireless transmission on the first channel may for example include a UL wireless transmission from the first wireless station to the AP. Such UL wireless transmission may be performed in response to the instruction of step 620. Alternatively or in addition, the at least one wireless transmission on the first channel may include a DL wireless transmission from the AP to the first wireless station, e.g., as performed at step 630.

In some scenarios, the AP may receive the further measurement report in response to a request from the AP, e.g., in response to the request of step 640. Alternatively, the second wireless station could autonomously send the further measurement report. For example, sending of the further measurement report could be triggered by an event detected by the second wireless station, such as the measured level of interference on the second channel exceeding a threshold. In some scenarios, the further measurement report may be based on a measurement of the level of interference by the second wireless station during a UL wireless transmission on the first channel, e.g., the UL wireless transmission instructed at step 620, and this measurement may be performed autonomously by the second wireless station. In some scenarios, the further measurement report may be based on a measurement of the level of interference by the second wireless station during a UL wireless transmission on the first channel, e.g., the UL wireless transmission instructed at step 620, and this measurement may be performed in response to a request from the AP, e.g., the request of step 640. In some scenarios, the further measurement report may be based on a measurement of the level of interference by the second wireless station during a DL wireless transmission on the first channel, e.g., the DL wireless transmission performed at step 630, and this measurement may be performed autonomously by the second wireless station. In some scenarios, the further measurement report may be based on a measurement of the level of interference by the second wireless station during a DL wireless transmission on the first channel, e.g., the DL wireless transmission performed at step 630, and this measurement may be performed in response to a request from the AP, e.g., the request of step 640.

At step 660, the AP controls MLO on the first wireless link and the second wireless link. The control of the MLO at step 660 is based on the one or more measurement reports received at step 650.

In some scenarios, the control the MLO at step 660 may involve switching the first wireless link from the first channel to another channel and/or switching the second wireless link from the second channel to another channel. For example, the one or more measurement reports could be used as input for a channel allocation algorithm aiming at selecting the channels for the first link and the second link in such a way that cross-channel interference is avoided or at least reduced.

In some scenarios, the control the MLO at step 660 may involve synchronizing a DL wireless transmission on the first wireless link with a DL wireless transmission on the second wireless link, e.g., when using simultaneous DL MLO. In some scenarios, the control the MLO at step 660 may involve synchronizing a UL wireless transmission on the first wireless link with a UL wireless transmission on the second wireless link, e.g., when using simultaneous UL MLO.

In some scenarios, the control the MLO at step 660 may involve adjusting one or more transmit parameters of a DL transmission on the first wireless link and/or adjusting one or more transmit parameters of a DL transmission on the second wireless link. For example, such transmit parameters of the DL wireless transmission may relate to transmit power control, MCS selection, and/or transmit beamforming processing. In some scenarios, the control the MLO at step 660 may involve adjusting one or more transmit parameters of a UL wireless transmission on the first wireless link and/or adjusting one or more transmit parameters of a UL wireless transmission on the second wireless link. For example, such transmit parameters of the UL wireless transmission may relate to transmit power control, MCS selection, and/or transmit beamforming processing.

In some scenarios, the control the MLO at step 660 may involve sequentially performing a DL wireless transmission on the first wireless link and a DL wireless transmission on the second wireless link. For example, the AP could decide to switch from simultaneous DL MLO to non-simultaneous DL transmissions. In some scenarios, the control the MLO at step 660 may involve sequentially performing a UL wireless transmission on the first wireless link and a UL wireless transmission on the second wireless link. For example, the AP could decide to switch from simultaneous UL MLO to non-simultaneous UL transmissions.

In some scenarios, the control the MLO at step 660 may involve restricting UL access of the first wireless station to the first channel and/or restricting UL access of the second wireless station to the second channel, e.g., with the aim of controlling timing of UL transmissions on the first wireless link and/or controlling the timing of UL transmissions on the second wireless link. The restriction of UL access may for example involve mandating triggered channel access or mandating an RTS/CTS frame handshake before a UL wireless transmission.

In some scenarios, the control the MLO at step 660 may involve avoiding to perform a DL wireless transmission on the first wireless link concurrently with a UL wireless transmission on the second wireless link and/or avoiding to perform a DL wireless transmission on the second wireless link concurrently with a UL wireless transmission on the first wireless link.

Figure 7:
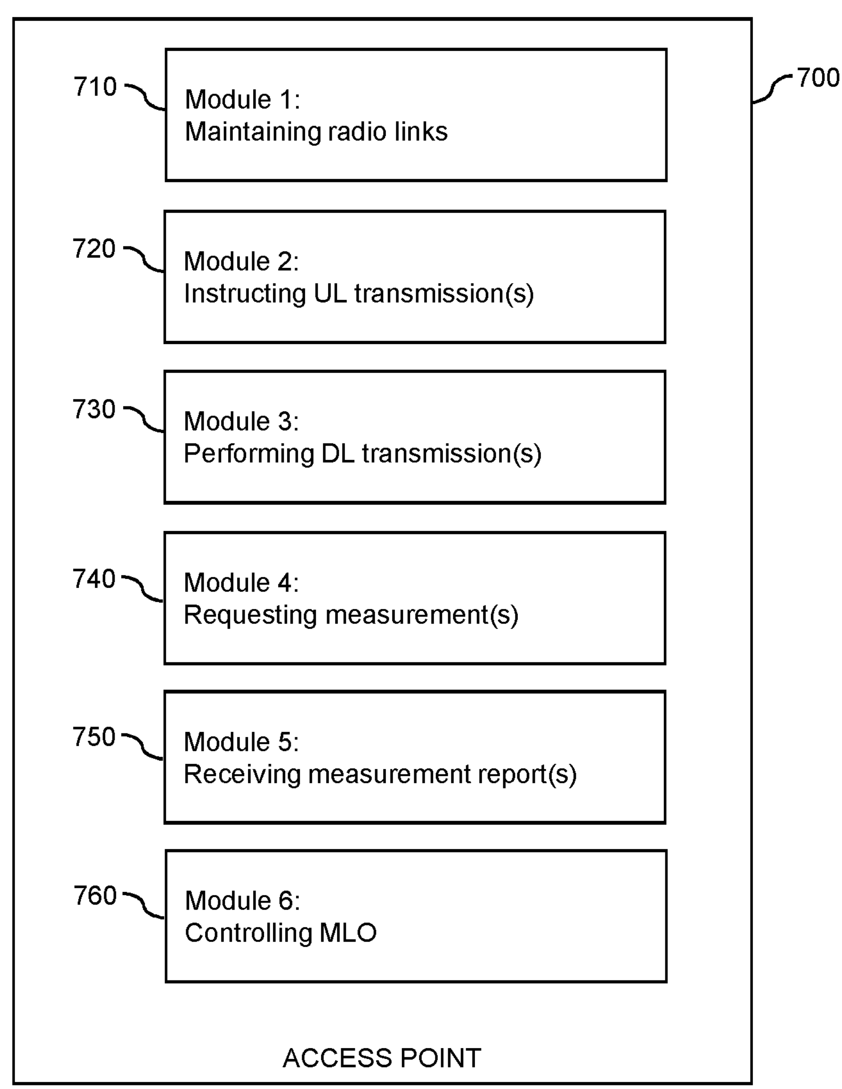
FIG. 7 shows a block diagram for schematically illustrating functionalities of an AP according to an embodiment.

FIG. 7 shows a block diagram for illustrating functionalities of an AP 700 which operates according to the method of FIG. 6. The AP 700 may for example correspond to one of the above-mentioned APs 10. As illustrated, the AP 700 may be provided with a module 710 configured to maintain a first wireless link on a first channel and a second wireless link on a second channel, such as explained in connection with step 610. Further, the AP 700 may be provided with a module 720 configured to instruct one or more UL wireless transmissions, such as explained in connection with step 620. Further, the AP 700 may be provided with a module 730 configured to perform one or more DL wireless transmissions, such as explained in connection with step 630. Further, the AP 700 may be provided with a module 740 configured to request one or more measurements, such as explained in connection with step 640. Further, the AP 700 may be provided with a module 750 configured to receive one or more measurement reports, such as explained in connection with step 650. Further, the AP 700 may be provided with a module 760 configured to control MLO, such as explained in connection with step 660.

It is noted that the AP 700 may include further modules for implementing other functionalities, such as known functionalities of a WLAN AP. Further, it is noted that the modules of the AP 700 do not necessarily represent a hardware structure of the AP 700, but may also correspond to functional elements, e.g., implemented by hardware, software, or a combination thereof.

It is noted that the functionalities as described in connection with FIGS. 6 and 7 could also be implemented in a system, e.g., a system including the AP, the first wireless station, and the second wireless station, with the AP being configured to operate according to the method of FIG. 6.

Figure 8:
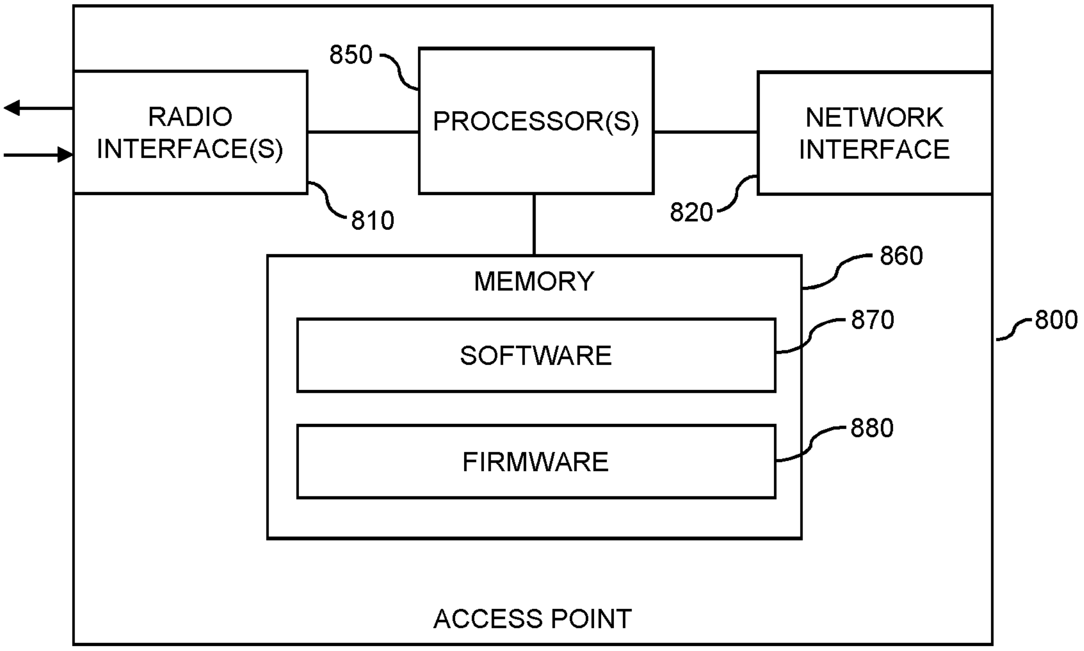
FIG. 8 schematically illustrates structures of an AP according to an embodiment.

FIG. 8 illustrates a processor-based implementation of an AP 800 which may be used for implementing the above-described concepts. For example, the structures as illustrated in FIG. 8 may be used for implementing the concepts in any of the above-mentioned APs 10.

As illustrated, the AP 800 includes one or more radio interfaces 810. The radio interface(s) 810 may for example be based on a WLAN technology, e.g., according to an IEEE 802.11 family standard. However, other wireless technologies could be supported as well, e.g., the LTE technology or the NR technology. The radio interface(s) 810 may be based on multiple radios to support MLO operation of the AP 800. As further illustrated, the AP 800 may also include one or more network interfaces 820 which may be used for communication with other nodes of a wireless communication network, e.g., with other APs or with an application service platform as illustrated in FIG. 1.

Further, the AP 800 may include one or more processors 850 coupled to the interface(s) 810, 820 and a memory 860 coupled to the processor(s) 850. By way of example, the interface(s) 810, 820 the processor(s) 850, and the memory 860 could be coupled by one or more internal bus systems of the AP 800. The memory 860 may include a ROM (Read Only Memory), e.g., a flash ROM, a RAM (Random Access Memory), e.g., a DRAM (Dynamic RAM) or SRAM (Static RAM), a mass storage, e.g., a hard disk or solid state disk, or the like. As illustrated, the memory 860 may include software 870 and/or firmware 880. The memory 860 may include suitably configured program code to be executed by the processor(s) 850 so as to implement the above-described functionalities for controlling wireless transmissions, such as explained in connection with FIG. 6.

It is to be understood that the structures as illustrated in FIG. 8 are merely schematic and that the AP 800 may actually include further components which, for the sake of clarity, have not been illustrated, e.g., further interfaces or further processors. Also, it is to be understood that the memory 860 may include further program code for implementing known functionalities of a WLAN AP. According to some embodiments, also a computer program may be provided for implementing functionalities of the AP 800, e.g., in the form of a physical medium storing the program code and/or other data to be stored in the memory 860 or by making the program code available for download or by streaming.

As can be seen, the concepts as described above may be used for efficiently controlling MLO of an AP in various scenarios, in particular involving MLO of the AP with respect to non-MLD STAs and/or STAs supporting different versions of the WLAN standard. In particular, the measurement reports provided by the associated STAs may enable the AP to efficiently consider cross-channel interference between MLO channels and to avoid reception failures being caused by such cross-channel interference.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and STAs. Further, the illustrated concepts may be applied to various combinations of channels and channels from various frequency bands. Further, the above concepts as explained for a pair of MLO channels could also be extended to consider MLO performed based on three or more channels.

Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless transmissions in a wireless communication system, the method comprising:

on a first channel, an access point of the wireless communication system maintaining a first wireless link to a first wireless station;

on a second channel, the access point maintaining a second wireless link to a second wireless station;

the access point receiving a measurement report from the first wireless station, the measurement report representing a level of interference from the second channel to the first channel; and based on the measurement report, the access point controlling multi-link operation on the first wireless link and the second wireless link, wherein said controlling multi-link operation on the first wireless link and the second wireless link comprises selecting a type of multi-link operation.

2. The method of claim 1, wherein the measurement report is based on at least one measurement performed by the first wireless station on the first channel during a wireless transmission on the second channel.

3. The method of claim 2, comprising:

the access point requesting the first wireless station to perform a measurement of the level of interference concurrently with an uplink wireless transmission on the second channel from the second wireless station to the access point and to send the measurement report based on the requested measurement.

4. The method of claim 2, comprising:

the access point instructing the second wireless station to perform an uplink wireless transmission on the second channel.

5. The method of claim 2, comprising:

the access point performing a downlink wireless transmission to the second wireless station on the second channel; and the access point requesting the first wireless station to perform a measurement of the level of interference concurrently with the downlink wireless transmission on the second channel and to send the measurement report based on the requested measurement.

6. The method of claim 1, comprising:

the access point receiving a further measurement report from the second wireless station, the further measurement report representing a level of interference from the first channel to the second channel, wherein said controlling of the multi-link operation is further based on the further measurement report.

7. The method of claim 6, wherein the further measurement report is based on at least one measurement performed by the second wireless station on the second channel during at least one wireless transmission on the first channel.

8. The method of claim 1, wherein the access point requests the first wireless station to send the measurement report.

9. The method of claim 1, wherein said controlling the multi-link operation comprises switching the first wireless link from the first channel to another channel.

10. The method of claim 1, wherein said controlling the multi-link operation comprises switching the second wireless link from the second channel to another channel.

11. The method of claim 1, wherein said controlling the multi-link operation comprises synchronizing a downlink wireless transmission on the first wireless link with a downlink wireless transmission on the second wireless link.

12. The method of claim 1, wherein said controlling the multi-link operation comprises synchronizing an uplink wireless transmission on the first wireless link with an uplink wireless transmission on the second wireless link.

13. The method of claim 1, wherein said controlling the multi-link operation comprises adjusting one or more transmit parameters of a downlink wireless transmission on the first wireless link and/or adjusting one or more transmit parameters of a downlink wireless transmission on the second wireless link.

14. The method of claim 1, wherein said controlling the multi-link operation comprises adjusting one or more transmit parameters of an uplink wireless transmission on the first wireless link and/or adjusting one or more transmit parameters of an uplink wireless transmission on the second wireless link.

15. The method of claim 1, wherein said controlling the multi-link operation comprises sequentially performing a downlink wireless transmission on the first wireless link and a downlink wireless transmission on the second wireless link.

16. The method of claim 1, wherein said controlling the multi-link operation comprises sequentially performing an uplink wireless transmission on the first wireless link and an uplink wireless transmission on the second wireless link.

17. The method of claim 1, wherein said controlling the multi-link operation comprises restricting uplink access of the first wireless station to the first channel.

18. The method of claim 1, wherein said controlling the multi-link operation comprises restricting uplink access of the second wireless station to the second channel.

19. The method of claim 1, wherein said controlling the multi-link operation comprises avoiding to perform a downlink wireless transmission on the first wireless link concurrently with an uplink wireless transmission on the second wireless link or avoiding to perform a downlink wireless transmission on the second wireless link concurrently with an uplink wireless transmission on the first wireless link.

20. An access point for a wireless communication system, the access point comprising radio circuitry and processing circuitry operatively coupled to the radio circuitry, the processing circuitry being configured to use the radio circuitry to:

on a first channel, maintain a first wireless link to a first wireless station;

on a second channel, maintain a second wireless link to a second wireless station;

receive a measurement report from the first wireless station, the measurement report representing a level of interference from the second channel to the first channel; and based on the measurement report, control multi-link operation on the first wireless link and the second wireless link by selecting a type of multi-link operation.

* * * * *